No. 704,963. Patented July 15, 1902.
O. L. HARROD.
POULTRY PERCH.
(Application filed June 24, 1901.)

(No Model.)

Witnesses
O. M. Simpson
C. N. Woodward

O. L. Harrod Inventor
by C. A. Snow & Co.
Attorneys

UNITED STATES PATENT OFFICE.

ORRIAN L. HARROD, OF BELLE CENTER, OHIO, ASSIGNOR TO MEDICATED POULTRY PERCH COMPANY, OF BELLE CENTER, OHIO.

POULTRY-PERCH.

SPECIFICATION forming part of Letters Patent No. 704,963, dated July 15, 1902.

Application filed June 24, 1901. Serial No. 65,863. (No model.)

*To all whom it may concern:*

Be it known that I, ORRIAN L. HARROD, a citizen of the United States, residing at Belle Center, in the county of Logan and State of Ohio, have invented a new and useful Poultry-Perch, of which the following is a specification.

This invention relates to perches for fowls and other perching birds or animals; and it consists in forming the perch with a longitudinal cavity and of separable parts and with perforations in one or both parts, so that vermin-destroying ingredients or compounds or medicaments may be placed therein in a position to subject the animal or the vermin upon them to their influence while the fowls are in position upon the perch; and the invention consists in the construction, combination, and arrangement of parts, as hereinafter shown and described, and specifically pointed out in the claims.

Figure 1:
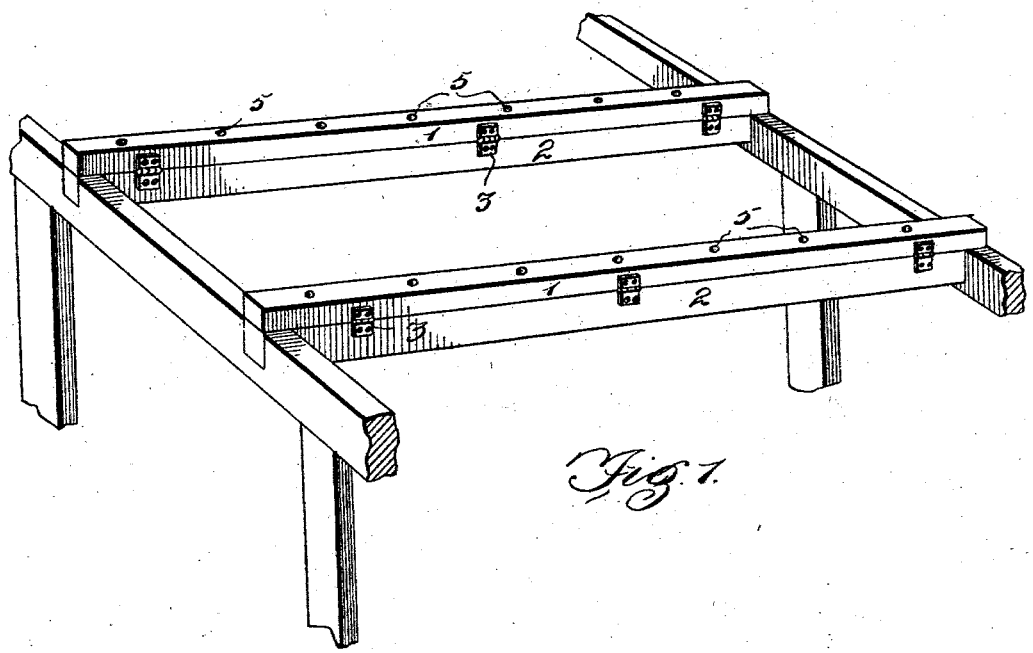
Figure 2:
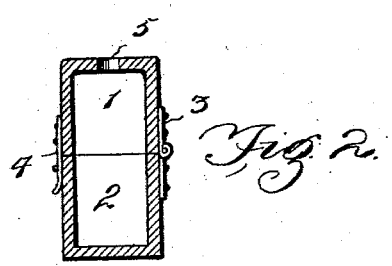

In the drawings illustrative of the invention, Figure 1 is a perspective view of a pair of perches with a portion of the supporting-framework embodying my improvements. Fig. 2 is a cross-section, enlarged, of one of the perches on the line $a\ a$ of Fig. 1.

This invention consists in separable hollow perches for the houses, coops, or cages of fowl and other perching birds or animals to provide for treating such animals to compounds or ingredients, preferably volatile, that will have the effect of destroying vermin and other parasites and also to enable volatile medicaments to be transmitted to the birds while on their perches.

The invention consists particularly in forming the perch in two parts 1 and 2, one or both of which parts are hollow, as shown in Fig. 2, and the parts preferably united by hinges 3 and with suitable fastenings 4.

The upper section 1 will be provided at suitable intervals with perforations 5, and similar perforations may also be formed in the lower section 2, if required.

The insect-destroying compound will be placed in the hollow perch and allowed to escape through perforations 5, and thus destroy the vermin or other injurious parasites. Medical compounds may also be inserted into the hollow perch and be free to escape and come in contact with the fowl upon the perches and be equally as effective.

The perches may be of any size or shape and may be arranged with the lower sections attached permanently to the supports or removable, as may be preferred. They may be of any suitable material and adapted to any form or size of poultry house, coop, or cage and may be adapted to any class of perching birds or animals.

The same device may be arranged with slight modifications in the floors or nesting-places of any kind of animal.

What I claim as new is—

1. A poultry-perch consisting of a hollow closed-ended structure composed of two parts hinged together, one of the parts being provided with perforations communicating with the interior of the perch.

2. A poultry-perch consisting of a hollow closed-ended structure composed of two parts hinged together and to contain a suitable insecticide in bulk, one of the parts being provided with perforations communicating with the interior of the perch, and fastening means for holding the parts assembled.

In testimony that I claim the foregoing as my own I have hereto affixed my signature in the presence of two witnesses.

ORRIAN L. HARROD.

Witnesses:
JOSEPH C. BRIGGS,
JOHN O. ANGELL.